July 18, 1939.   H. SCHUCHARDT   2,166,920
FLIGHT ATTITUDE INDICATOR
Filed March 2, 1938   2 Sheets-Sheet 1

Inventor:
Hans Schuchardt

July 18, 1939.  H. SCHUCHARDT  2,166,920

FLIGHT ATTITUDE INDICATOR

Filed March 2, 1938   2 Sheets-Sheet 2

Inventor:
Hans Schuchardt

Patented July 18, 1939

2,166,920

UNITED STATES PATENT OFFICE 2,166,920

FLIGHT ATTITUDE INDICATOR

Hans Schuchardt, Berlin, Germany, assignor to Askania-Werke A. G., a corporation of Germany Application March 2, 1938, Serial No. 193,594
In Germany March 2, 1937

5 Claims. (Cl. 33—204)

This invention relates to attitude indicators for aircraft.

In high-speed airplanes it is very desirable on flying blind to have an instrument which will give an impressive view of only small deviations of the craft from its normal flying attitude.

The general object of my invention, therefore, is to provide an indicator which makes apparent any small change in attitude to enable the pilot to respond as early as possible to the operation of the controls, thereby avoiding considerable departures of the craft from its straight line of flight, and which also can be made light in weight with small dimensions. Reliable attitude indicators are mostly furnished with a gyroscope and, therefore, relatively heavy and expensive, high precision work being required in their manufacture. According to this invention a plurality of indicators can be operated by one master control which may be of the type as described in the copending specification to Gert Zoege von Manteuffel, Ser. No. 181,439, dated December 23, 1937. It is understood that the controlling instrument need not be provided with indicators and in such case could be placed at any convenient part of the airplane apart from the instrument board.

The invention will readily be understood by reference to the following specification in conjunction with the accompanying drawings, in which.

Figure 1:
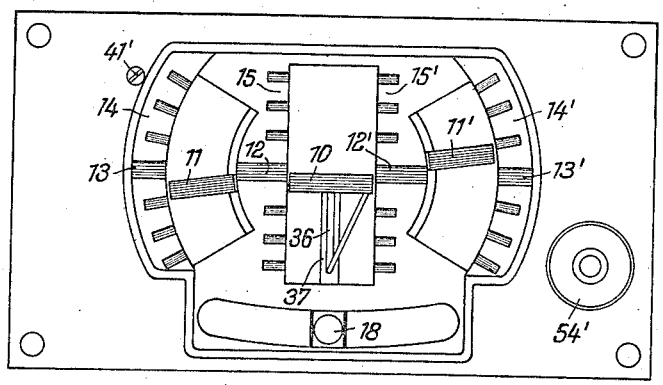
Fig. 1 is a face view of the indicator as it appears from in front of the instrument panel.

In Figure 1 the transverse bar 10 is for indicating pitch only, whilst two radially extending bars 11, 11' show the angle of bank 12, 12', and 13, 13' are reference marks fixed to the casing which represent the horizon line. In their undeflected position the pitch indicating bar 10, the reference marks 12, 12', the two bank indicating bars 11, 11', and finally the reference marks 13, 13' form a continuous line of equal width, whereby small changes in attitude of the craft may readily be perceived, the human eye being very sensitive towards any interruptions of a straight line.

The position of the indicating elements chosen in Figure 1 corresponds to a left hand bank and, furthermore, a slight dip of the nose of the airplane. The two radial bars 11, 11' represent the wings of the airplane, and the angle of bank can be read on arcuate scales 14, 14' disposed at the outer circumference of the face of the indicator, the angle of pitch being determinable from a scale 15, 15' symmetrically disposed at both sides of the pitch responsive bar 10.

As in many cases it may not be necessary to know the amount of the pitch and bank, the scales can be dispensed with, in this way the impression becoming still somewhat more striking. A similar effect could be obtained by applying self-luminous paint only to the parts 10 to 13, so that the zero marks of the scales will dominate by far over the graduations.

Underneath the pitch and bank indicating bars a ball level indicator 18 is arranged which in connection with the bank indicators shows in known manner whether a curve is flown correctly.

Figure 2:
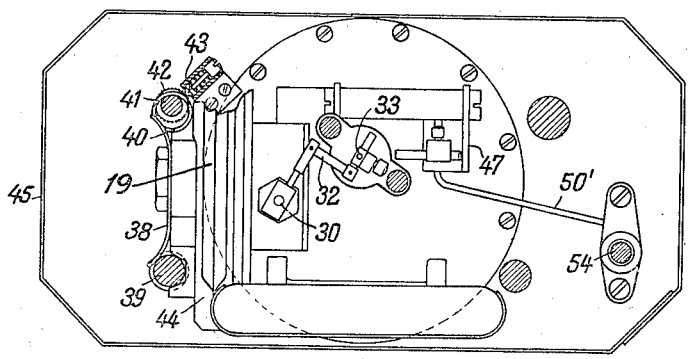
Fig. 2 is a vertical section through the lower part of the instrument taken along the line 2—2 in Figure 4.
Figure 3:
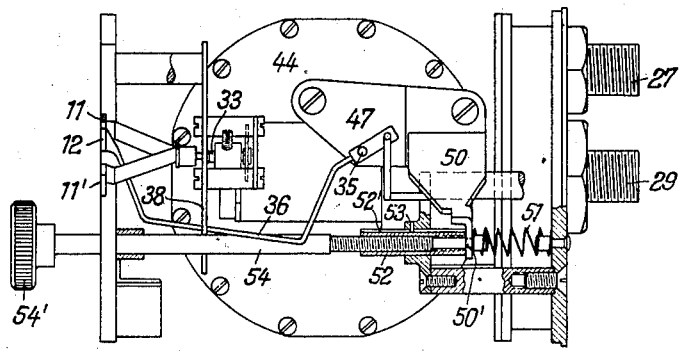
Fig. 3 is a side elevation of the lower part of the instrument with the cover taken away.
Figure 4:
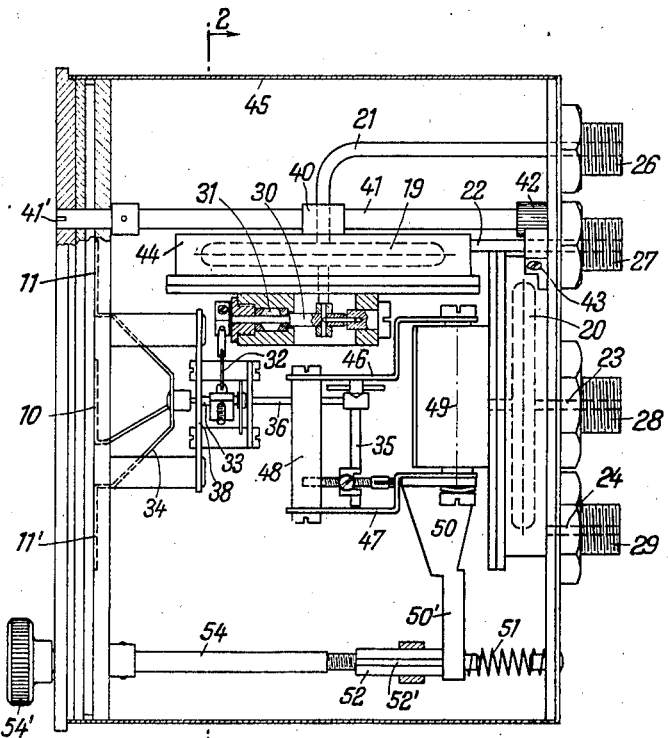
Fig. 4 is a corresponding plan view partly in section.

Referring now to Figures 2 to 4 the operation of the bank and pitch indicating device will be explained. The same is operated by remote control as has been pointed out already before. The necessary deflections are transferred to the indicating bars by two differential pressure boxes 19, 20, each of which is provided with two air-conduits 21, 22, and 23, 24, respectively, leading to the interior of the pressure box or the housing. The two pressure boxes will be connected to a pneumatic controller by means of coupling screws 26 to 29. The controller may be of the type shown in the beforementioned specification, Ser. No. 181,439, but any other pneumatic relay could be used, such for instance, as described in the patent to Wünsch, No. 1,729,850, dated October 1, 1929.

The movement of the first pressure box 19 is transmitted to an axle 30 which transfers the movement with a minimum of friction through a practically air-tight packing 31 to a lever 32 causing by its reciprocation a corresponding turning movement of an axle 33 centrally disposed with respect to the instrument. The left end of this axle carries a V-shaped bar 34 whose ends 11, 11' serve to indicate the angle of bank as already described.

In a quite similar way the movement of the other pressure box 20 is transferred to an axle 35 which carries a lever 36 with the pitch indicating bar 10 at its end. The lever 36 passes through a vertically extending slot 37 (Fig. 1) in the plate 38 covering the interior of the instrument.

Means are provided for adjusting the pitch and bank indicators to zero. For this purpose the pressure box 19 is resiliently connected to the casing of the instrument by a leaf spring 38 (see Fig. 2) which is attached at its middle to the rear side of the pressure box and rests with one end against a solid stem 39, with the other end against an eccentric 40 secured on an axle 41. This axle has at the end extending towards the face of the instrument a slot 41' (see Fig. 4), so that it can be turned by means of a screw driver. A ratchet wheel 42 with a pawl 43 serves to hold the axle 41 with the eccentric 40 in correct position. It will be clear from the foregoing that upon turning of the axle 41 the housing 44 of the pressure box 20 which is held by the leaf spring 38 against the stem 39 and the eccentric piece 41 will be turned about stem 39 and tilted with respect to the casing 45, thereby causing a turning of the axle 33 and a movement of the bank indicating bar 11, 11'.

For the adjustment of the pitch indicating bar 10 the axle 35 is mounted between two plates 46, 47 (Fig. 4) screwed together by a distance piece 48 and pivotable about an axis 49. Secured to these two plates is an angularly bent piece 50 whose end 50' is interposed between a coil spring 51 and a threaded sleeve 52 provided with an axially extending slot 52'. Into this slot engages a pin 53 (see Fig. 3) to prevent the sleeve 52 from turning. The sleeve may be moved to and fro by a screw 54 turnable by a knob 54' in front of the instrument. On rotating this knob the rigidly interconnected parts 50', 50, 46, 47, 48 are moved about axis 49, and axle 35 is moved up or down accordingly, thereby causing a corresponding movement of the pitch indicating bar 10.

The bank indication is not to be adjusted during the flight after it has once been set to its zero position. On the other hand, the longitudinal inclination of the craft is not constant, but changes even in horizontal flight according to variations of the centre of gravity. If in consequence of some cause or other such a permanent change has occurred, the bank indicating bar 10 can be made to register again with the horizon.

The sensitivity of the indications may be brought to any desired degree by choosing the diaphragms of the pressure boxes correspondingly or changing the value of the pneumatic control.

The construction shown is merely illustrative and represents an embodiment of the invention which I consider to be the best one at present.

Having described my invention, what I claim is:

1. An aircraft indicator adapted for remote control comprising in combination with a casing, a transverse bar responsive to pitching only, normally horizontal reference marks fixed to the casing forming a continuation of the ends of said bar in horizontal flight, bank indicators extending radially on both sides of the face of the indicator forming a continuation of said reference marks with the craft in an unbanked attitude and adapted to perform a circular movement upon rolling, and arcuate scales at the outer circumference of the face of the indicator for cooperating with said bank indicators to indicate the angle of bank the zero indices of said scales adapted to form a continuation of the bank indicating means when the craft is in straight level flight.

2. An aircraft indicator comprising in combination with a casing, a normally horizontal transverse bar, a first device adapted for remote control according to pitching of the craft, interconnecting elements between the said transverse bar and first device, a member carrying at least one of the said interconnecting elements pivotally mounted thereon, the said member being adjustable relatively to the casing for changing the zero position of said bar in order to allow for changes of the longitudinal inclination of the craft, normally horizontal reference marks fixed to the casing forming a continuation of the ends of said bar in horizontal flight, and a second device adapted for remote control interconnected to bank indicating means extending radially on both sides of the face of the indicator forming a continuation of said reference marks with the craft in an unbanked attitude and adapted to perform a circular movement upon rolling of the craft.

3. An aircraft indicator comprising in combination with a casing, a normally horizontal transverse bar, a first device adapted for remote control interconnected thereto to actuate the bar up and down on pitching of the craft, normally horizontal reference marks fixed to the casing forming a continuation of either end of the said bar in horizontal flight, bank indicating means extending radially on both sides of the face of the indicator forming a continuation of said reference marks with the craft in an unbanked attitude and mounted and controlled to perform a circular movement about the transverse bar, and a second device adapted for remote control interconnected to the said bank indicating means to actuate said means upon rolling of the craft.

4. An aircraft indicator adapted for remote control comprising in combination with a casing, a normally horizontal transverse bar, a differential pressure responsive device interconnected thereto and to actuate the bar up and down on pitching of the craft, normally horizontal reference marks fixed to the casing forming a continuation of either end of the said bar in horizontal flight, bank indicating means extending radially on both sides of the face of the indicator forming a continuation of said reference marks with the craft in an unbanked attitude and mounted and controlled to perform a circular movement about the transverse bar upon rolling of the craft, a differential pressure box interconnected to the said bank indicating means, an eccentric device adjustable with respect to the casing, and resilient means for holding the said pressure box in contact therewith, whereby the bank indication will be adjusted to zero upon corresponding turning of the eccentric device.

5. An aircraft indicator comprising in combination a casing, a normally horizontal transverse bar, a first remote controlled device responsive to pitching of the craft, interconnecting elements between the transverse bar and said pitch responsive device to bodily move the bar up and down as the craft glides and climbs, a member journalled within the casing carrying pivots for at least one of said interconnecting elements, a threaded shaft mounted for rotational movement in the casing, a threaded sleeve on said shaft adapted to move to and fro upon turning of the shaft, a spring holding said member in contact with said sleeve, a thumb piece for turning said shaft in order to change the zero position of said bar upon loading changes of the longitudinal inclination of the craft, normally horizontal reference marks fixed to the casing forming a continuation of the ends of said bar in horizontal flight, a second device adapted for remote control, and bank indicating means interconnected thereto and extending radially on both sides of the face of the indicator forming a continuation of said reference marks with the craft in an unbanked attitude and adapted to perform a circular movement upon rolling of the craft.

HANS SCHUCHARDT.